US009633584B2

(12) United States Patent
Underwood

(10) Patent No.: US 9,633,584 B2
(45) Date of Patent: Apr. 25, 2017

(54) ELECTRICAL OUTLET COVER PLATE WITH SIGNAGE FEATURE

(76) Inventor: Jeffrey L. Underwood, Garrett, IN (US)

( * ) Notice: Subject to any disclaimer, the term of this patent is extended or adjusted under 35 U.S.C. 154(b) by 673 days.

(21) Appl. No.: 13/542,317

(22) Filed: Jul. 5, 2012

(65) Prior Publication Data

US 2013/0180139 A1    Jul. 18, 2013

Related U.S. Application Data

(60) Provisional application No. 61/504,473, filed on Jul. 5, 2011.

(51) Int. Cl.
G09F 13/20   (2006.01)
H02G 1/00    (2006.01)
H02G 3/14    (2006.01)

(52) U.S. Cl.
CPC .............. *G09F 13/20* (2013.01); *H02G 1/00* (2013.01); *H02G 3/14* (2013.01); *Y10T 29/49117* (2015.01)

(58) Field of Classification Search
USPC .......................................................... 362/95
See application file for complete search history.

(56) References Cited

U.S. PATENT DOCUMENTS

| | | | |
|---|---|---|---|
| 3,780,462 A | 12/1973 | Pregel et al. | |
| 4,710,858 A * | 12/1987 | Van Hout et al. | 362/95 |
| 4,855,879 A * | 8/1989 | Soltani et al. | 362/84 |
| 5,544,025 A | 8/1996 | Bohlool et al. | |
| 5,572,819 A | 11/1996 | Topinka et al. | |
| 5,775,016 A | 7/1998 | Chien | |
| 5,816,682 A | 10/1998 | Marischen | |
| 6,237,266 B1 | 5/2001 | Tassey et al. | |
| 6,431,719 B1 * | 8/2002 | Lau et al. | 362/95 |
| 6,547,411 B1 | 4/2003 | Dornbusch | |
| 6,642,452 B2 | 11/2003 | Masson | |
| 7,186,000 B2 * | 3/2007 | Lebens et al. | 362/184 |
| 7,241,021 B2 | 7/2007 | Hannington | |
| 7,270,436 B2 | 9/2007 | Jasper | |
| 7,527,387 B2 * | 5/2009 | Birkenbach | 362/34 |
| 7,740,371 B1 * | 6/2010 | Lebens et al. | 362/205 |
| 8,215,815 B2 * | 7/2012 | Meir et al. | 362/606 |

(Continued)

FOREIGN PATENT DOCUMENTS

FR   2 550 046   2/1985
GB   1 542 839   3/1979

*Primary Examiner* — Shin Kim
(74) *Attorney, Agent, or Firm* — Faegre Baker Daniels LLP

(57) ABSTRACT

A sign is combined with an electrical outlet plate which can mount near or to existing electrical infrastructure to provide information such as direction toward an exit. A protruding and/or outwardly visible surface of the sign may be painted or adorned with a sign appliqué, and can be illuminated and/or photoluminescent to provide maximum visibility with or without electrical power. Advantageously, the sign can be mounted at electrical outlets and/or electrical switches that are near the floor and away from the ceiling, such that the sign remains visible even when lines of sight within a building are impaired, such as from smoke. In one exemplary embodiment, the sign is integrated into a portion of a standard-sized duplex cover plate, which can be mounted to an existing electrical junction box to preserve the functionality of adjacent electrical outlets or switches.

21 Claims, 5 Drawing Sheets

(56) References Cited

U.S. PATENT DOCUMENTS

| | | |
|---|---|---|
| 8,496,342 B2 * | 7/2013 | Misener .................. 362/95 |
| 2003/0051379 A1 | 3/2003 | Williams, Jr. |
| 2004/0159800 A1 | 8/2004 | Reilly |
| 2004/0184259 A1 | 9/2004 | To |
| 2006/0072302 A1 | 4/2006 | Chien |
| 2006/0075667 A1 | 4/2006 | Peters et al. |
| 2007/0263375 A1 * | 11/2007 | Birkenbach ............. 362/34 |
| 2007/0263377 A1 | 11/2007 | Butler |
| 2009/0052162 A1 * | 2/2009 | Richter et al. ........... 362/95 |
| 2009/0109653 A1 * | 4/2009 | Wu et al. ................. 362/95 |
| 2010/0033950 A1 | 2/2010 | Farrell |
| 2010/0033951 A1 | 2/2010 | Luginbuhl |
| 2012/0008307 A1 | 1/2012 | Delany |

\* cited by examiner

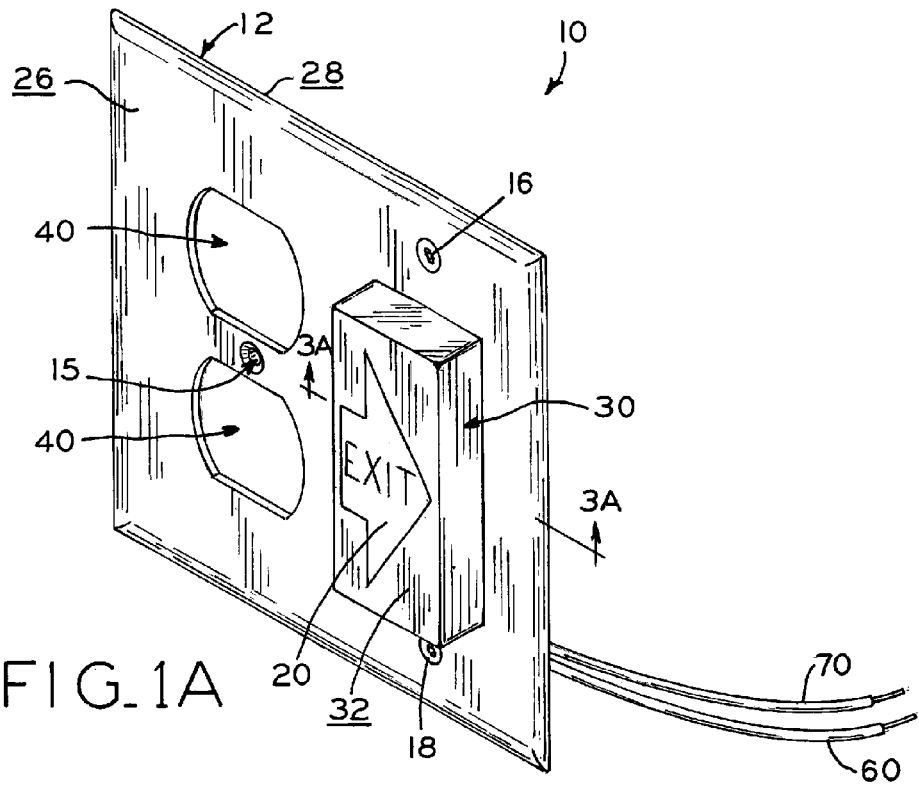
FIG_1A
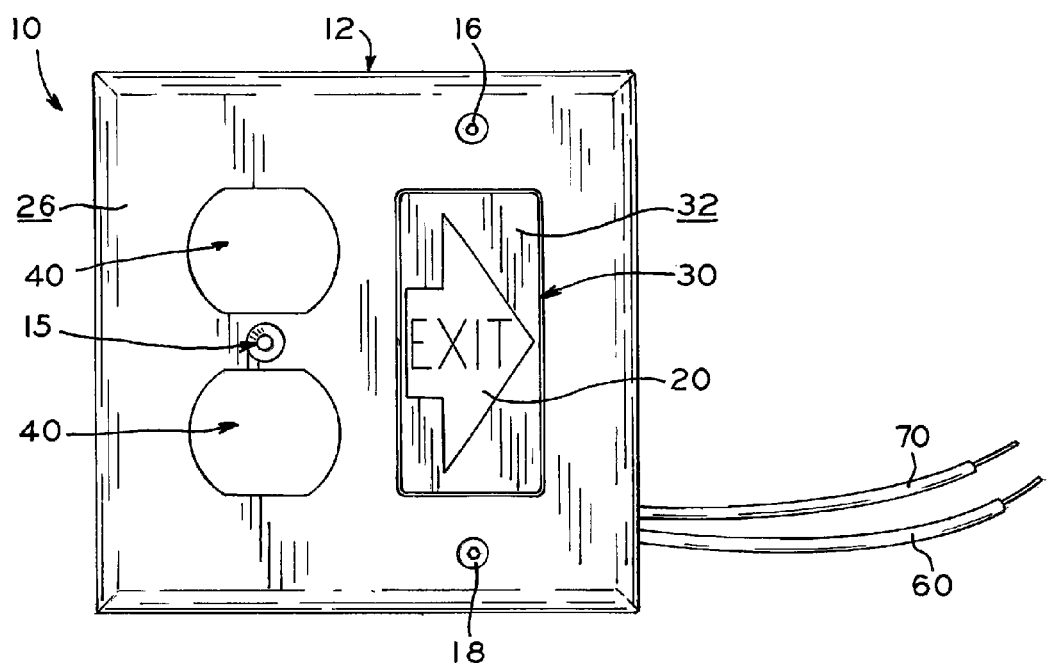
FIG_1B

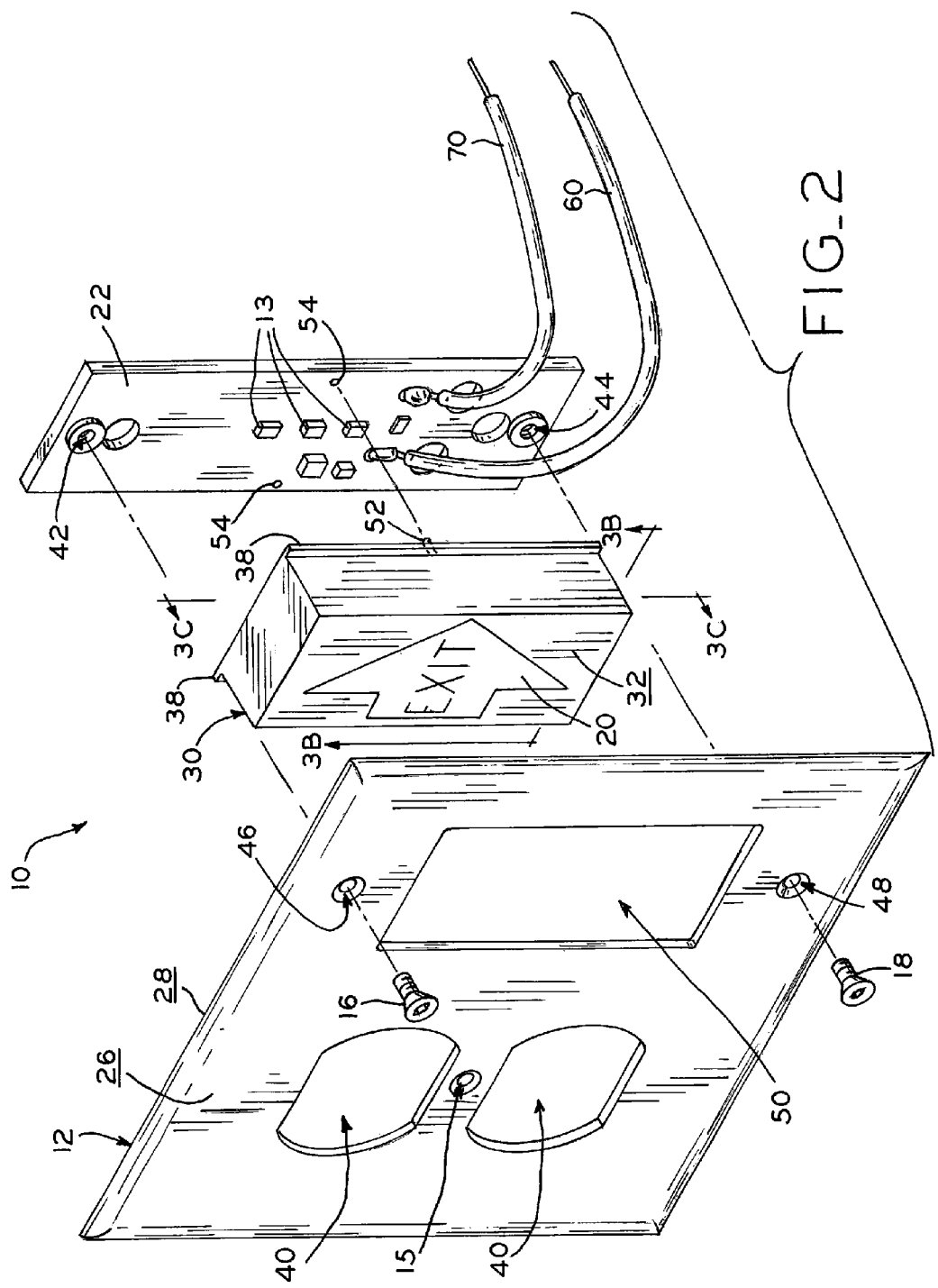
FIG_2

ELECTRICAL OUTLET COVER PLATE WITH SIGNAGE FEATURE

CROSS-REFERENCE TO RELATED APPLICATIONS

This application claims the benefit under Title 35, U.S.C. §119(e) of U.S. Provisional Patent Application Ser. No. 61/504,473 filed Jul. 5, 2011 and entitled ELECTRICAL OUTLET COVER PLATE WITH SIGNAGE FEATURE, the entire disclosure of which is hereby expressly incorporated by reference herein.

BACKGROUND

1. Technical Field

The present disclosure relates to electrical outlet cover plates and signs and, more particularly, to illuminated signs combined with electrical cover plates.

2. Description of the Related Art

Exit signs mounted in buildings near ceilings and above doors are commonly found in businesses and public spaces, and are often required by law. These signs are designed to aid in egress from a building during emergencies, such as a fire.

While exit signs installed near ceilings and/or above doorways are suitable for some purposes, such signs may become obscured by smoke in a fire at even short distances, such as about 10 steps. When such signs are obscured in this way, building occupants may be unable to find guidance for quickly and efficiently reaching emergency exits, at precisely the time such guidance is needed most.

Further, structure fires or other emergencies may interrupt electrical power to the existing exit signs in a building. For interior areas with limited natural light, or which have smoke or other obstructions obscuring the exit signs, a loss of electrical power to lighted exit signs may render such signs difficult or impossible to see, again hinder building occupants from finding guidance when needed most.

A system of signage that provides reliable information to visitors in numerous and varied locations is desirable. For example, exit information in public structures is ideally visible from any location in a building, even when lines of sight are impaired and electrical power is not available, to safely guide visitors toward the building exits.

SUMMARY

The present disclosure provides a sign, in combination with an electrical outlet plate, which can mount near or to existing electrical infrastructure to provide information such as direction toward an exit. A protruding and/or outwardly visible surface of the sign may be painted or adorned with a sign appliqué, and can be illuminated and/or photoluminescent to provide maximum visibility with or without electrical power. Advantageously, the sign can be mounted at electrical outlets and/or electrical switches that are near the floor and away from the ceiling, such that the sign remains visible even when lines of sight within a building are impaired, such as from smoke. In one exemplary embodiment, the sign is integrated into a portion of a standard-sized duplex cover plate, which can be mounted to an existing electrical junction box to preserve the functionality of adjacent electrical outlets or switches.

In one form thereof, the present disclosure provides a sign, comprising: a cover plate adapted to be mounted to a wall near an electrical source, the cover plate having a wall mounting surface, an opposed outwardly facing plate surface, and a sign aperture extending from the wall mounting surface to the outwardly facing plate surface; and a lens received in the sign aperture and protruding outwardly therefrom such that an outwardly facing lens surface is spaced outwardly from the outwardly facing plate surface, the lens having a visual indicia disposed on the outwardly facing lens surface, the lens comprising at least one of: i) a photoluminescent material capable of absorbing photons and discharging the absorbed photons over a period of at least 10 minutes, and ii) a radioluminescent material.

In another form thereof, the present disclosure provides a sign, comprising: an electrical cover plate having a wall mounting surface, an opposed outwardly facing plate surface, and a sign aperture extending from the wall mounting surface to the outwardly facing plate surface; a lens received in the sign aperture and protruding outwardly therefrom such that an outwardly facing lens surface is spaced outwardly from the outwardly facing plate surface, the lens defining an interior cavity opposed to the outwardly facing lens surface, the lens comprising at least one of: i) a photoluminescent material capable of absorbing photons and discharging the absorbed photons over a period of at least 10 minutes, and ii) a radioluminescent material; and a light source operable to provide light to the lens, the light source disposed within the interior cavity.

In yet another form thereof, the present disclosure provides a method of installing a sign, the method comprising: removing an existing cover plate from an underlying electrical access point disposed at an interior wall of a building; removing an electrical apparatus from one of the existing cover plate and the underlying electrical access point, the step of removing an electrical apparatus creating an available space behind a cover plate aperture when the cover plate is mounted to the electrical access point; installing a lens over the cover plate aperture such that the lens faces outwardly through the cover plate aperture and away from a wall-contacting surface of the cover plate, and such that the lens at least partially occupies the available space behind the cover plate aperture; the lens comprising at least one of: i) a photoluminescent material capable of absorbing photons and discharging the absorbed photons over a period of at least 10 minutes, and ii) a radioluminescent material; and reattaching the existing cover plate to the underlying electrical access point.

BRIEF DESCRIPTION OF THE DRAWINGS

The above mentioned and other features and objects of this disclosure, and the manner of attaining them, will become more apparent and the disclosure itself will be better understood by reference to the following description of embodiments of the disclosure taken in conjunction with the accompanying drawings, wherein:

FIG. 1A is a perspective view of a sign and duplex cover plate combination made in accordance with the present disclosure;

FIG. 1B is a front elevation view of a sign and duplex cover plate combination shown in FIG. 1A;

FIG. 2 is an exploded view of the sign and cover plate shown in FIG. 1, illustrating an arrangement of light sources inside the outwardly extending sign module;

Figure 3A:
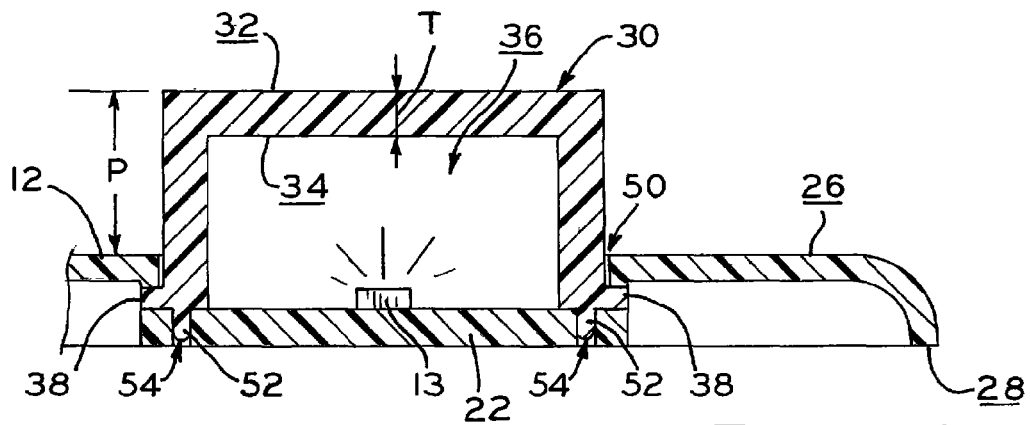
FIG. 3A is a bottom plan view of the lens of the sign module shown in FIG. 2.

Corresponding reference characters indicate corresponding parts throughout the several views. Although the exemplifications set out herein illustrate an embodiment of the disclosure, the embodiment disclosed below is not intended to be exhaustive or to be construed as limiting the scope of the disclosure to the precise form disclosed.

DETAILED DESCRIPTION

A photoluminescent sign is sized for mounting to standard electrical outlet covers. The cover may be mounted to a low point on a wall at a point of existing electrical infrastructure, such that the cover is disposed at eye level for a person crawling or low-walking out of a smoky building. The sign may have at least one indicia or message imprinted thereon, such as "EXIT" with an arrow pointing toward the direction of a nearby building exit. Other messages may be provided, such as "nearest fire extinguisher," "non smoking room," "turn lights off" or any other pertinent information. The sign may or may not be illuminated from within by a light source. The sign may also be mounted to any standard electrical cover plate, such as a standard duplex outlet cover plate or a light switch cover plate.

For purposes of the present disclosure, "photoluminescence" refers to the absorption and re-radiation of photons from a material. In the context of the lenses disclosed herein, such as lens 30, the photoluminescent material does not immediately re-emit the radiation it absorbs, but instead emits such radiation over a period of at least several minutes. Photoluminescence materials includes phosphor materials, which are materials made of or containing a substance that exhibit the phenomenon of luminescence. For purposes of the present disclosure, phosphor materials are those materials which exhibit a slow decay in brightness after being "charged" with photons from a light source, such as over a period of at least several minutes.

Figure 4A:
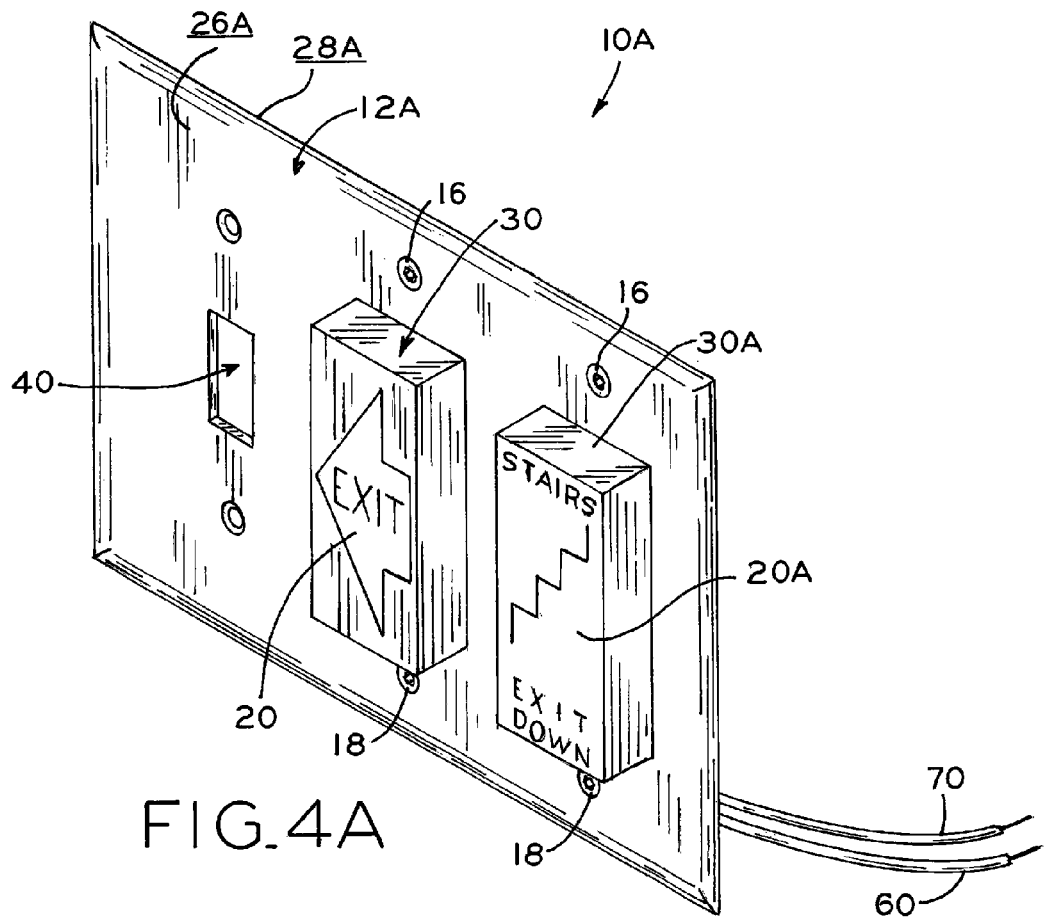
FIG. 4A is a perspective view of another sign and cover plate made in accordance with the present disclosure, in which two signs are combined with a switch plate.
Figure 5:
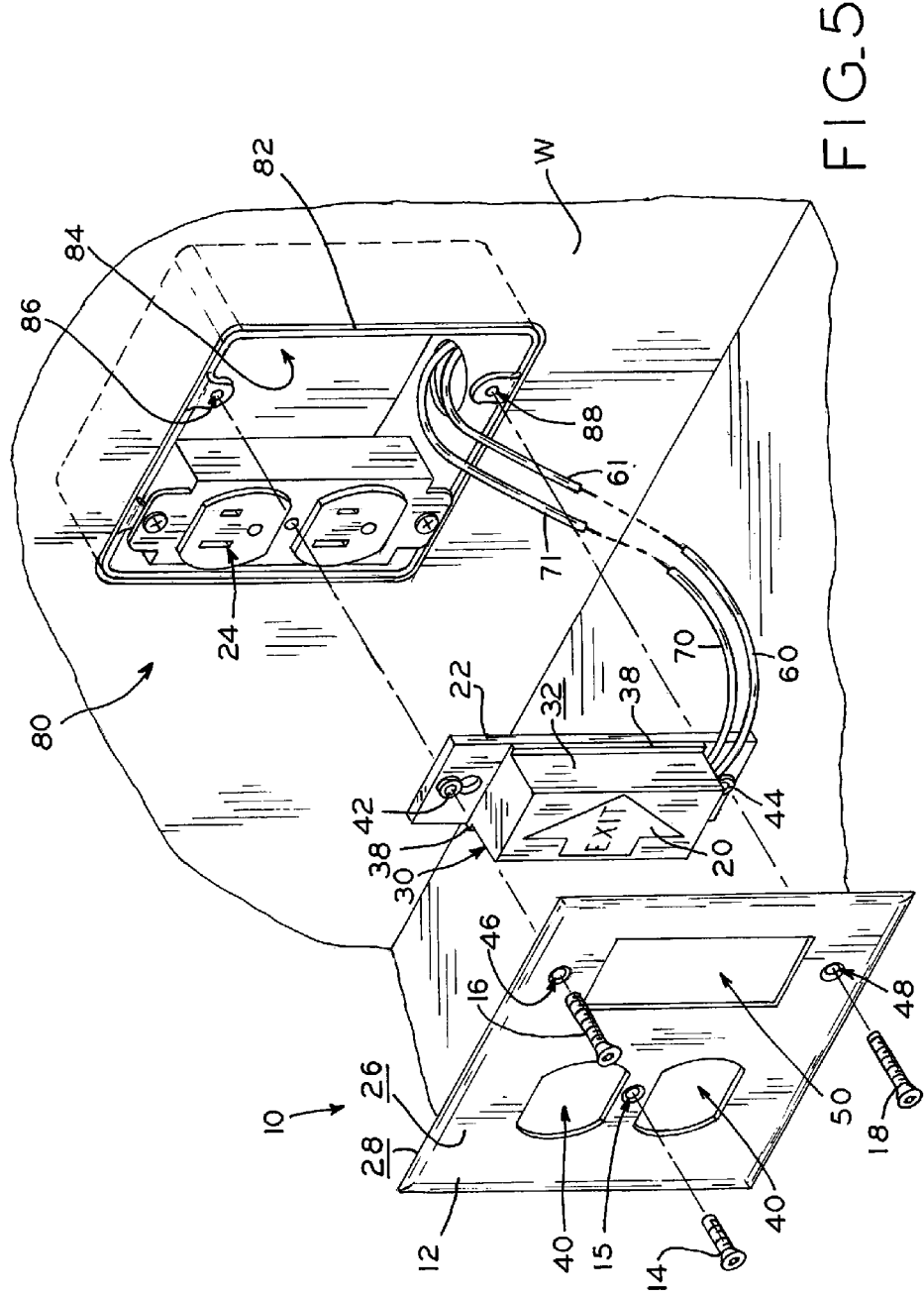
FIG. 5 is a perspective, exploded view of a sign and duplex cover plate combination in accordance with the present disclosure.

Referring now to FIGS. 1A, 1B and 3, there is shown an exemplary embodiment of the present disclosure including sign assembly 10 combined with duplex cover plate 12. A pair of insulated conductors 60, 70 extends from the rear of sign assembly 10, with each conductor 60, 70 adapted to be connected to an electrical source. Next to sign assembly 10 on cover plate 12 are apparatus apertures 40, which are sized to accept standard, wall mounted duplex electrical outlets 24 (FIG. 5). Although apertures 40 are shown as having an appropriate size and shape for 120V duplex wall outlets commonly found in U.S. residences and businesses, it is contemplated that apertures 40 may have any shape and size to accommodate any electrical apparatus. Exemplary alternative cutouts may be sized and shaped for 220V wall outlets, or for light switches (as shown in FIG. 4A and described below), or any other wall-mounted electrical apparatus.

In an exemplary embodiment, duplex cover plate 12 is a standard duplex cover plate that is widely commercially available. For example, in the United States duplex cover plate 12 may be $4^{13}/_{16}$ wide×$4^{7}/_{8}$ tall, which is a standard "two-device" size cover plate which accommodates side-by-side left and right electrical devices (i.e., switches, outlets, etc.) arranged along the horizontal, $4^{13}/_{16}$ wide edges of plate 12.

In the illustrative embodiment of FIG. 2, one of the two device apertures of duplex cover plate 12 is sign aperture 50, which is sized and shaped to fit sign assembly 10 therewithin such that lens 30 of sign assembly 10 protrudes outwardly from outwardly-facing surface 26 (as best seen in FIGS. 1A and 3A). In the exemplary embodiment shown, lens 30 has a generally box-shaped outer profile, such that outwardly facing lens surface 32 includes five surfaces (top, bottom, sides and front) which are visible when lens 30 is mounted to cover plate 12. However, it is contemplated that outwardly facing lens surface 32 may take other forms, such as a rounded or bulbous shape for example, which are capable of protruding outwardly past outwardly facing surface 26 of cover plate 12.

Figure 3B:
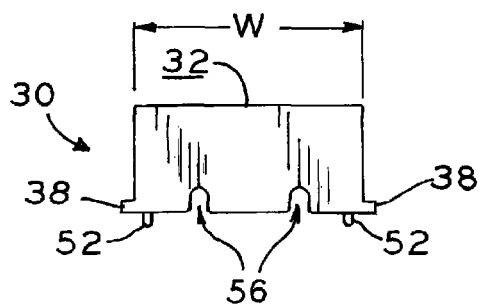
FIG. 3B is a side elevation view of the lens of the sign module shown in FIG. 2.
Figure 3C:
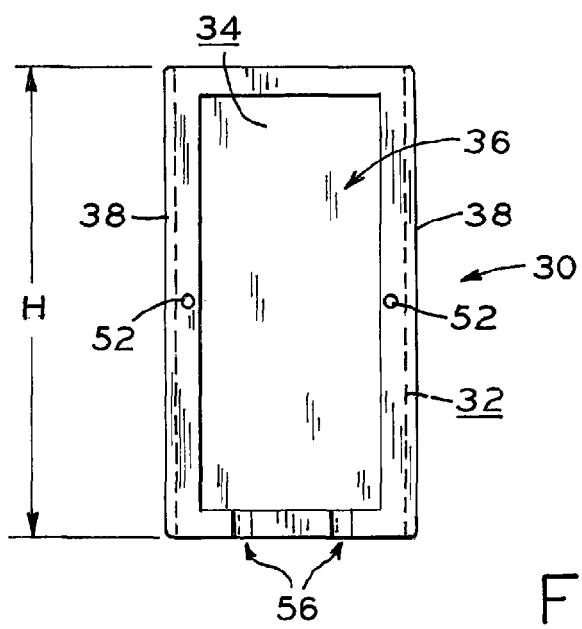
FIG. 3C is a cross-sectional view of the lens of the sign module shown in FIG. 2, taken through line 3C-3C of FIG. 1A.

As best seen in FIGS. 3A-3C, lens 30 includes shoulder 38 formed at the base of lens 30. Shoulder 38 protrudes laterally outwardly from the side edges of outwardly facing lens surface 32 such that when lens 30 is received in sign aperture 50, shoulder 38 abuts the adjacent undersurface of cover plate 12. More particularly, assembly of lens 30 to cover plate 12 is accomplished by passing lens 30 through aperture 50 from the back of plate 12 (i.e., from wall-contacting surface 28 toward outwardly facing surface 26). When fully received therein, lens 30 defines an outward protrusion distance P (FIG. 3A) such that outwardly facing lens surface 32 is spaced outwardly away from outwardly facing plate surface 26. Advantageously, this outward spacing renders the side surfaces of outwardly facing lens surface 32 visible not only when looking directly at lens 30, but also when looking at lens 30 from either side. In an emergency situation, such as a structure fire, a viewer will be able to see a series of sign assemblies 10, both near and far, because lens 30 protrudes outwardly. In an exemplary embodiment, distance P may be as little as 0.13 inches, 0.2 inches or 0.25 inches, or may be as much as 0.5 inches, 0.75 inches, 1, inch, or greater, or may be any distance within any range defined by any of the foregoing values. In one particularly exemplary embodiment, protrusion distance P may be $7/_{16}$ inches, which is large enough for lens 30 to be highly visible from all sides but small enough for lens 30 to avoid any undue interference with adjacent switches or electrical apparatus.

Alternatively, lens 30 may omit shoulder 38 such that assembly of lens 30 to cover plate 12 can occur along a front-to-back path, i.e., from outwardly facing plate surface 26 toward wall-contacting plate surface 28. In this alternative embodiment, lens 30 may be press-fit into aperture 50 to provide initial fixation to cover plate 12, and additional fixation may be provided by adhesive, for example.

In an exemplary embodiment, aperture 50 is between 1.25 to 1.3 inches wide and between 2.6 to 2.63 inches high, while width dimension W and height dimension H of lens 30 (FIGS. 3B and 3C) are slightly smaller than aperture 50, such as about $1/_{32}$ inch or $1/_{16}$ inch smaller. Advantageously, these dimensions of sign aperture 50 are of common manufacture for so called "Decora" panel-type wall switches available from Leviton Manufacturing Company, Inc., or for standard ground-fault circuit interrupter (GFCI) devices commonly available. Thus, the standard outer dimensions of lens 30 allowing sign assembly 10 to be assembled to existing, inexpensive cover plates.

In one alternative, lens 30 can be made larger, either by expanding the size of aperture 50 or by expanding outwardly facing lens surface 32 past aperture 50, e.g., by widening and/or lengthening the cross-section of lens 30 as surface 32 extends outwardly away from outwardly facing plate surface 26. In this alternative embodiment, lens 30 would be arranged to assembly to cover plate 12 along the "front-to-back" assembly path described above. In yet another alternative, lens 30 can occupy the entire area of cover plate 12 entirely, such as by being integrally and/or monolithically formed with cover plate 12. Moreover, it is contemplated that lens 30 can take any size and shape as required or desired for a particular application, including sizes large enough to cover the entire outwardly facing plate surface 26 or even to extend laterally past such surface. Regardless of the size and configuration of lens 30, lens 30 may attach to cover plate 12 for mounting to a wall as described herein.

In the illustrated embodiment of FIG. 3A, lens 30 is substantially hollow such that an inwardly facing lens surface 34 defines an interior cavity 36 open to wall mounting surface 28 of cover plate 12. As best seen in FIG. 2, sign assembly 10 includes backing plate 22 disposed behind lens 30, such that one side of backing plate 22 faces into interior cavity 36. When backing plate 22 is coupled to lens 30 and cover plate 12 (as shown in FIGS. 2 and 3A, and described further below), interior cavity 36 extends between wall-mounting surface 28 of cover plate 12 and inwardly facing lens surface 34 of lens 30. In this configuration, interior cavity 36 is bounded at the front and sides by inwardly facing surface 34 and at the back by backing plate 22.

Backing plate 22 includes upper and lower threaded holes 42, 44 for attachment of backing plate 22 to cover plate 12. In an exemplary embodiment, threaded holes 42, 44 are provided by threaded anchors fixed to backing plate 22. The threaded anchors may be made of a strong, resilient material such as aluminum or steel, such that backing plate 22 itself may be made from a softer material, such as a plastic or polymer. Backing plate 22 is attached to cover plate 12 by passing mounting screws 16, 18 through upper and lower mounting holes 46, 48 formed in cover plate 12, then threading screws 16, 18 into upper and lower threaded holes 42, 44 of backing plate 22. When screws 16, 18 are tightened, lens 30 (and, more particularly, shoulders 38) is trapped between backing plate 22 and the adjacent portion of wall-contacting surface 28 of cover plate 12. In one exemplary embodiment, screws 16, 18 are spaced vertically from one another by $3^{13}/_{16}$ inches, such that their location is compatible with the standard screw holes found on many U.S. electrical outlet boxes.

In order to ensure and maintain proper alignment between lens 30 and backing plate 22 during assembly and use of sign assembly 10, lens 30 may include alignment pins 52 (FIGS. 2 and 3B) which are received within pin holes 54 formed in backing plate 22. In order to facilitate passage of conductors 60.70 out of interior cavity 36 of lens 30, wire cutouts 56 may be formed in the back face of lens 30 as shown in FIGS. 3B and 3C. In one alternative embodiment, backing plate 22 may be omitted from sign assembly 10, and alignment pins 52 may then serve as standoffs to hold lens 30 away from the adjacent wall or other mounting surface. In this alternative embodiment, wire cutouts 56 can be omitted.

Referring now to FIG. 2, sign assembly 10, a plurality of light sources 13 are shown mounted on backing plate 22. In this illustrative embodiment, backing plate 22 is a printed circuit board which receives electrical power from insulated conductors 60, 70 and distributes this electrical power in a correct polarity and voltage to light sources 13, such that application of power activates light sources 13. In an exemplary embodiment, backing plate/circuit board 22 is made of a fiberglass material and imprinted with conductors. However, it is contemplated that the backing plate/circuit board 22 may be made from any material providing adequate rigidity and electrical insulation, and may be made of a material amenable to receiving imprinted conductors.

When light sources 13 are activated, light is provided within interior cavity 36 of defined by lens 30 as shown in FIG. 3. In this lighted embodiment, the material of lens 30 is translucent, which allows light from light source(s) 13 to pass therethrough to illuminate the part of lens 30 non-covered by appliqué 20 as described below. In the illustrative embodiment, lens 30 is constructed of a photoluminescent and translucent plastic. However, lens 30 may be made of any material that allows light to pass therethrough and/or is luminescent.

In one exemplary embodiment, lens 30 of sign assembly 10 is made of photoluminescent material, such that sign assembly 10 will remain "glowing" for a time even after power to light sources 13 is interrupted. Moreover, the illumination of light sources 13 provides ultraviolet energy to activate the photoluminescent material of lens 30, thereby ensuring that lens 30 will glow brightly for a significant time span after power is lost. For example, the material of lens 30 may be polycarbonate or ABS plastic, which is robust and fire retardant. This material may be embedded with a phosphor, such as strontium aluminate activated with a suitable dopant (e.g. europium) to provide a photoluminescent quality to lens 30. When so embedded, such phosphor materials exhibit substantial photon discharge over periods of time on the order of minutes or hours, such as at least 10 minutes.

In order to ensure a length and brightness of discharge for use in the context of building safety signs, an exemplary embodiment of the present disclosure provides lens 30 with a substantial material thickness T, as shown in FIG. 3A. Such thickness provides a large volume of material for storage of photon energy by the embedded phosphor. In addition to the additional brightness and length of photon discharge provided by this large volume, additional enhancement is generated as the inner volume (i.e., the material at and near inwardly facing lens surface 34) discharges photons toward the outer volume (i.e., material at and near outwardly facing lens surface 32). These outwardly discharging photons are temporarily stored and re-emitted from the material, thereby serving to simultaneously discharge and "recharge" the photoluminescent material of lens 30.

In an exemplary embodiment, thickness T is at least 0.10 inches, such as about ⅛-inch. It is contemplated that thickness T may be as little as 0.05 inches, 0.08 inches, 0.10 inches, or as much as 0.12 inches, 0.15 inches, 0.25 inches or more, or may be any thickness within any range defined by any of the foregoing values. Advantageously, lens 30 made in accordance with the present disclosure provides photon discharge sufficient to illuminate the material of lens 30 for at least 5 hours, and up to 24-32 hours. This timeframe provides ample time for egress of building occupants during an emergency where sign assembly 10 is used along walls in hallways or rooms.

Moreover, exemplary embodiments providing longer discharge times on the order of 24-32 hours can illuminate lens 30 even if the "charging" lights (which may include ambient natural light, ambient electrical light, or light from light source 13 for example) have not been available for an extended period of time before an emergency. In one example, a building's lights and electrical power may be shut off for the evening and restarted in the morning. Also during the evening time, ambient light from the sun will not be available to "charge" the material of lens 30. The elapsed time of no "charging" may be, for example, about 12 hours. If an emergency occurs shortly after occupants have returned to the building the following morning, lens 30 is still able to illuminate the shortest path to an exit, for example, because the total discharge time is only about half elapsed. Thus, even without any significant recent "recharging" from ambient lights or light source 13, sign assembly 10 is still able to provide its function of providing information in case of emergency.

The wavelength of light discharged from lens 30 depends on the internal crystal structure of the material. Colors provided in accordance with the present disclosure include aqua having a wavelength of about 490 nm, blue-green with a wavelength of about 505 nm, and green with a wavelength of about 520 nm. Green is provides the brightest discharge, while aqua provides the longest lasting discharge. However, it is contemplated that other colors may be provided having wavelengths as short as 200 nm and as long as 520 nm or greater, thereby discharging other colors such as pink.

In addition, it is contemplated that other phosphors may be used, including zinc sulfate compounds and Cadmium Sulfate compounds, for example. A further alternative is to made lens 30 about of a material containing a radioluminescent such as tritium, which glows in the dark but requires no external power inputs. For example, a tritium-embedded radioluminescent material may glow continuously and reliably for 10-20 years.

Light sources 13 may be Light Emitting Diodes (LEDs), incandescent bulbs, or any other suitable source. In an exemplary embodiment, a plurality of light sources (such as three light sources, as shown in FIG. 2) are connected in series and electrically powered via conductors 60, 70. In one exemplary embodiment, light sources 13 are LED bulbs emitting light in the visible wavelength range, such as 380-740 nm. Such bulbs can consume just 1.5-3.8 watts of energy and have a life expectancy of at least 10 years.

In another exemplary embodiment, light source 13 may be an LED configured to emit ultraviolet light, i.e., light having a wavelength between 10-400 nm. Such UV LED light sources provide UV charging light for the material of lens 30 directly from electrical power provided by conductors 60, 70. Because UV light is the light wavelength which primarily acts to store energy in phosphors, this direct depositing of UV light into the phosphors embedded in lens 30 provides superior charging of the photoluminescent material. This provides faster and more robust "charging" of the material, thereby providing a longer and brighter discharge from lens 30. In exemplary building systems utilizing sign assemblies 10, UV light sources 13 can be provided at each location of cover plate 12, thereby providing continuously charging of the material of lens 30 regardless of whether a typical ambient visible light source, such as an overhead light, is present or activated. Moreover, providing light source 13 within cavity 36 of lens 30, and most clearly shown in FIG. 3A, also provides the building operator with control over the time and manner of photon deposition into the material of lens 30. This in turn ensures reliable and consistent discharge characteristics in case of a building emergency.

In yet other embodiments, a mixture of UV (i.e., non-visible) and conventional (i.e., visible) sources of light may be provided in the form of light sources 13, such that the material of lens 30 is effectively and efficiently charged by the UV light source 13 while the visible-light source 13 illuminates lens 30 and makes indicia 20 easier to discern.

In still another alternative embodiment, light source 13 may be omitted from within cavity 36 defined by lens 30. These applications might be appropriate for situations where sufficient ambient charging light is available, such as at least 54 LUX (5 ft-candles) of fluorescent, metal halide or mercury vapor light for 60-min. Such ambient-light-only applications might include emergency signs, as described herein, or may be nightlights which provide some illumination after room lights are extinguished. These applications carry advantages including minimal installation cost, zero power consumption, and maintenance-free operation.

For such non-powered applications, lens 30 may be omitted from sign assembly and backing plate 22 may be provided with embedded phosphors in a similar fashion as lens 30 described above. Thus, backing plate 22 may emit a glow from discharging photons, while also remaining flush with or recessed from outwardly facing surface 26 of cover plate 12.

In certain exemplary embodiments, lens 30 is provided with a sign appliqué 20 attached thereto. In the illustrative embodiments of the FIGS. 1A, 1B and 2, for example, appliqué 20 is an "EXIT" sign with an arrow to point toward the nearest building exit. Sign assembly 10 having sign appliqué 20 may be mounted near the floor with duplex cover plate 12 at the interior of a building structure, as noted herein, to provide information to a viewer such as the location and direction of a the nearest building exit, or any other pertinent information. In an exemplary embodiment, appliqué 20 is applied as screened ink, though any method to apply visual indicia to outwardly facing lens surface 32 may be used such as painting, adhesive-backed coverings, and the like. Any color may be employed to achieve the desired visibility.

In an alternative embodiment, shown in FIG. 4A, sign assembly 10A may include cover plate 12A. Cover plate 12A is similar to cover plate 12 described above, and like reference numbers indicate like structures and features. However, cover plate 12A includes switch aperture 40A sized to receive a standard-sized electrical toggle switch of the type used to switch room lights on and off, instead of duplex outlet apertures 40 as shown in FIG. 1A with respect to cover plate 12. For example, switch aperture may be $^{13}/_{32}$-inches wide×1-inch tall, which advantageously fits a standard toggle switch of the type commonly used to turn room lights on and off in a building.

Cover plate 12A also differs from cover plate 12 in that two sign apertures 50 are included. As illustrated, these two sign apertures 50 may be used to convey separate but related messages, such as by attaching exit sign lens 30 in one of apertures 50 and stairs sign lens 30A in the other aperture 50. Cover plate 12A allows for lenses 30, 30A to be mounted at a midpoint on a wall (such as wall W, FIG. 5) to provide signage at the light-switch level. Advantageously, the typically higher mounting location of cover plate 12A is substantially above the typical mounting location of cover plate 12, and thereby avoids potential obstructions due to furniture, etc.

Advantageously, cover plates 12, 12A can be provided as a system of signage for a building to convey information at any location suitable for a light switch or outlet. As such, sign assemblies 10, 10A can be placed in any location where the direction of travel to the nearest exit is not apparent. A series of sign assemblies 10 and/or 10A can be provided along a hallway, for example, such that occupants can see more than one sign at any one time and can follow the serial sign messages safely to a building exit.

Figure 4B:
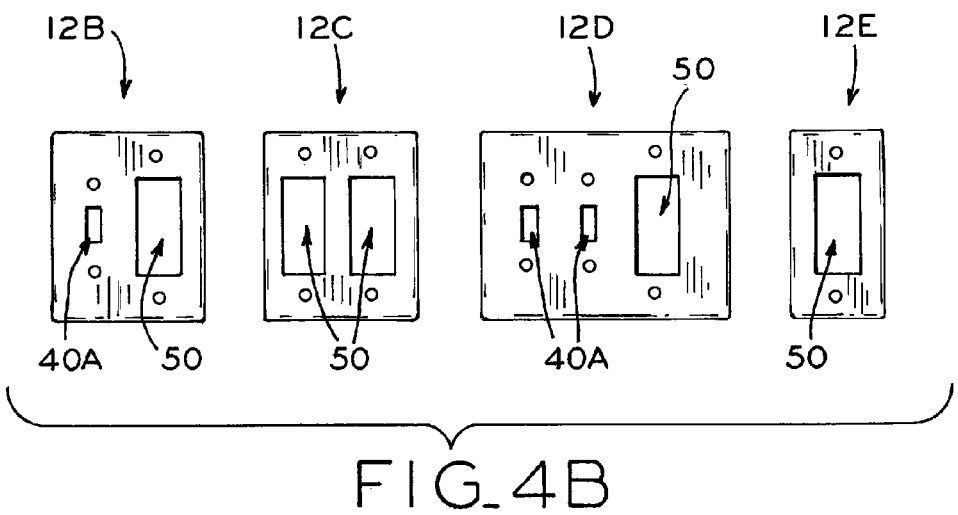
FIG. 4B is an elevation view of further cover plates usable with signs made in accordance with the present disclosure.

As shown in FIG. 4B, other standard cover plate arrangements 12B-12E are amenable to use with lens 30, backing plate 22 and/or the other structures described herein. Cover plate 12B includes sign aperture 50 in combination with switch aperture 40A, described above. Cover plate 12C includes two sign apertures 50, with one or both of apertures 50 usable to receive a lens in accordance with the present disclosure (e.g., one of lenses 30, 30A described herein). Cover plate 12D includes sign aperture 50 and two switch apertures 40A. Cover plate 12E includes only sign aperture 50. Cover plates 12, 12A, 12B, 12C, 12D and/or 12E may be used in any desired combination as a system of signage within a building.

Buildings especially suitable to use with sign assemblies 10, 10A include hospitals and other medical facilities, college dormitories and other campus buildings, office buildings, and the like. Sign assemblies 10, 10A are particularly helpful in building spaces where natural light is not available, such as underground areas or interior rooms including lavatories and storage rooms.

A method of installation of a sign assembly will now be described with reference to sign assembly 10, it being understood that other sign assemblies made in accordance with the present disclosure may be installed in a similar fashion. First, lens 30 is assembled to backing plate 22 and backing plate 22 is in turn threadably connected to cover plate 12 using screws 16, 18, as shown in FIG. 2 and described in detail above. In the case of lens 30, sign appliqué 20 bearing the "EXIT" sign is chosen and installed such that the arrow points to the nearest building exit. After connecting lens 30 to plate 12, a sign assembly 10 is preassembled and ready for mounting to wall W as shown in FIG. 5.

In some cases, sign assembly 10 may be retrofitted to existing electrical infrastructure, and may even utilize the existing cover plates. In such cases, after disconnecting electrical power for safety, the existing cover plate may be removed from an underlying electrical access point 80 (FIG. 5) disposed along interior wall W in a building. To make room for lens 30 and the associated structures, an electrical apparatus may be removed from either the existing cover plate 12, if attached to the cover plate, or from junction box 82 of underlying electrical access point 80. In an exemplary embodiment, lens 30 is sized to be received within sign aperture 50 which corresponds to a ground-fault circuit interrupt (GFCI) outlet or a standard "Decora" type panel switch as described above. Therefore, the removed electrical apparatus may be a GFCI outlet or panel switch.

When the chosen existing electrical apparatus is removed, an available space 84 is created that aligns with sign aperture 50 of cover plate 12 when cover plate 12 is mounted back upon junction box 82 at electrical access point 80.

Wires 60 and 70 are then connected to the existing electrical infrastructure to provide power to light source(s) 13. Such electrical connection is made by connecting wires 60, 70 to the electrical source of the building at source wires 61, 71 (FIG. 5). In an exemplary embodiment, the positive one of wires 60, 70 should be connected to an "always energized" source wire 61 or 71 such that light source(s) are energized regardless of the state of any adjacent switch or outlet. When so connected, light source(s) 13 advantageously have a continuous supply of electrical current as long as the electrical infrastructure of the building is operational.

Cover plate 12 can then be mounted over junction box 82 at electrical access point. Mounting screw 14 may then be passed through mounting hole 15 formed in cover plate 12 and threaded into the underlying electrical apparatus (shown as standard duplex outlet 24) to attach cover plate 12, together with lens 30 and backing plate 22, to junction box 82. When so mounted, cover plate covers electrical access point 80 and abuts wall W as shown in FIG. 5. Advantageously, because sign assembly 10 is provided on electrical cover plate 12, electrical wires 60 and 70 may connected to the same electrical power source used for powering the electrical outlets 24 passing through apertures 40 of duplex cover plate 12.

In addition cover plate 12 can be mounted to junction box using screws 16, 18 used to attach backing plate 22 to cover plate 12. Screws 16, 18 may be provided in sufficient length to protrude beyond the back of cover plate 12, such that screws 16, 18 may also thread into upper and lower threaded holes 86, 88, respectively, formed in junction box 82.

With sign assembly 10 now installed to electrical access point, electrical power may be activated to provide electrical power to light source(s) 13. Advantageously, the above-described installation procedure can be accomplished by anyone with basic skills and equipment to wire an electrical outlet to existing electrical infrastructure.

While this disclosure has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sign, comprising:
   a cover plate adapted to be mounted to a wall near an electrical source, said cover plate having a wall mounting surface, an opposed outwardly facing plate surface, and a sign aperture extending from said wall mounting surface to said outwardly facing plate surface; and
   a lens received in said sign aperture and protruding outwardly therefrom such that an outwardly facing lens surface is spaced outwardly from said outwardly facing plate surface, said lens having a visual indicia disposed on said outwardly facing lens surface,
   said lens comprising a photoluminescent material capable of absorbing photons and discharging the absorbed photons over a period of at least 10 minutes in the absence of photon absorption.

2. The sign of claim 1, wherein:
   said lens defines an inwardly facing lens surface opposite said outwardly facing lens surface, said lens defining an interior cavity extending between said wall mounting surface of said cover plate and said inwardly facing lens surface of said lens, and
   said sign further comprising a light source received within said interior cavity of said lens and spaced from the inwardly facing lens surface, said light source connectable to electrical power to provide light from within said interior cavity.

3. The sign of claim 2, wherein said light source comprises at least one of an incandescent light bulb configured to emit visible light, a light emitting diode configured to emit visible light, and a light emitting diode configured to emit ultraviolet light.

4. The sign of claim 1, wherein:
said cover plate is mounted to a location corresponding to a light switch or outlet along a wall in at least one of a hallway or a room within a building;
said outwardly facing lens surface is spaced outwardly from said outwardly facing plate surface by at least 0.13 inches, and has an emergency guidance indicia disposed on said outwardly facing lens surface and providing guidance toward a nearest building exit; and
said lens defining a generally box-shaped outer profile including top, bottom and side surfaces in addition to said outwardly facing lens surface, all of which are visible from within the room or hallway when said lens is mounted to said cover plate.

5. The sign of claim 1, wherein said lens defines a rectangular profile at said sign aperture, said rectangular profile 1.3 inches wide and 2.6 inches high, whereby said lens fits within said aperture interchangeably with standard ground-fault circuit interrupter (GFCI) devices.

6. The sign of claim 4, wherein said lens defines a material thickness between said outwardly facing lens surface and an opposed inwardly facing lens surface, said material thickness equal to at least 0.10-inches and said lens includes embedded europium, such that the material of said lens stores sufficient photon energy to provide said discharge period of at least 10 minutes.

7. The sign of claim 6, wherein said cover plate further comprises an apparatus aperture sized to receive at least one of a standard electrical switch and a standard electrical wall outlet.

8. The sign of claim 7, wherein said cover plate comprises a standard size electrical plate measuring 4$\frac{13}{16}$-inches wide and 4$\frac{7}{8}$-inches tall.

9. A sign located in a building, comprising:
an electrical cover plate having a wall mounting surface mounted to a location corresponding to a light switch or outlet along a wall in at least one of a hallway or a room within the building, an opposed outwardly facing plate surface, and a sign aperture extending from said wall mounting surface to said outwardly facing plate surface;
an emergency notification lens received in said sign aperture and protruding outwardly therefrom such that an outwardly facing lens surface is spaced outwardly from said outwardly facing plate surface, said lens having an emergency guidance indicia disposed on said outwardly facing lens surface and providing guidance toward a nearest building exit, said lens defining an interior cavity opposed to said outwardly facing lens surface,
said lens comprising a photoluminescent material capable of absorbing photons and discharging the absorbed photons over a period of at least 10 minutes, whereby photon discharge sufficient to illuminate said lens is provided for a time sufficient for egress of building occupants during an emergency in which interior room lights are extinguished; and
an electric light source connected to an energized electrical source wire providing a continuous supply of electrical current as long as an electrical infrastructure of the building is operational such that light is provided to said lens when said electric power is available, said light source disposed within said interior cavity to provide continuous photon storage as said continuous supply of electrical current is provided, such that reliable and consistent photon discharge from said lens is ensured in case of a disruption to said continuous supply of electrical current.

10. The sign of claim 9, further comprising a backing plate coupled to said electrical cover plate, said backing plate cooperating with an inwardly facing lens surface opposed to said outwardly facing lens surface to bound said interior cavity, said light source coupled to said backing plate.

11. A method of installing a sign, the method comprising:
removing a pre-existing cover plate from an underlying electrical access point disposed at an interior wall of a building, the pre-existing cover plate having an aperture sized to accommodate an electrical apparatus;
removing the electrical apparatus from one of the pre-existing cover plate and the underlying electrical access point, said step of removing an electrical apparatus creating an available space behind a cover plate aperture when the cover plate is mounted to the electrical access point;
installing a lens over the cover plate aperture such that the lens faces outwardly through the cover plate aperture and away from a wall-contacting surface of the cover plate, and such that the lens at least partially occupies the available space behind the cover plate aperture, whereby the lens replaces the electrical apparatus as the occupant of the cover plate aperture;
the lens comprising a photoluminescent material capable of absorbing photons and discharging the absorbed photons over a period of at least 10 minutes; and
reattaching the pre-existing cover plate to the underlying electrical access point.

12. The method of claim 11, wherein the lens protrudes outwardly from an outer surface of the cover plate when the lens is installed to the cover plate.

13. The method of claim 12, wherein said step of installing the lens comprises passing the lens through the cover plate aperture from the wall-contacting surface of the cover plate past an opposed outwardly facing plate surface of the cover plate,
said step of passing the lens through the cover plate performed after said step of removing the pre-existing cover plate and before said step of reattaching the pre-existing cover plate.

14. The method of claim 11, wherein said step of removing an electrical apparatus comprises removing one of a ground fault circuit interrupter and a panel-type wall switch from the pre-existing cover plate.

15. The method of claim 11, wherein said lens comprises an arrow-shaped indicia on an outwardly facing surface thereof, said steps of installing the lens and reattaching the pre-existing cover plate performed such that the arrow-shaped indicia points to a nearby exit from the building.

16. The method of claim 11, further comprising the steps of:
installing a backing plate behind the lens, the backing plate having at least one light source having electrical conductors operably connected thereto; and
connecting the electrical conductors to building electrical power supplied at the underlying electrical access point such that the light source has a continuous supply of current while the building electrical power is operational.

17. The method of claim 16, wherein the light source comprises at least one of an incandescent light bulb configured to emit visible light, a light emitting diode configured to emit visible light, and a light emitting diode configured to emit ultraviolet light.

18. The sign of claim 9, wherein said sign is one of a series of said signs provided along a wall in a building space lacking natural light, such that building occupants can see more than one sign at any one time and can follow the respective sign messages safely to a building exit.

19. The sign of claim 18, wherein said outwardly facing lens surface is spaced outwardly from said outwardly facing plate surface by at least 7/16 inches, whereby each said lens is highly visible from all sides but small enough to avoid undue interference with adjacent switches or electrical apparatus.

20. The sign of claim 19, wherein said series of said signs are mounted to respective low points on the wall corresponding to pre-existing electrical infrastructure of said building space.

21. The sign of claim 20, wherein said respective points of pre-existing electrical infrastructure comprise 120V duplex wall outlets, said sign aperture having a size and shape corresponding to said 120V duplex wall outlets whereby said sign is retrofittable to existing electrical infrastructure.

* * * * *